(No Model.)  2 Sheets—Sheet 1.

L. GUTMANN.
ELECTRIC MOTOR.

No. 446,864.  Patented Feb. 24, 1891.

Witnesses:
E. W. Benjamin.
Nellie L. Pope

Inventor:
Ludwig Gutmann.
By Edward P. Thompson
his Attorney.

THE NORRIS PETERS CO., PHOTO-LITHO., WASHINGTON, D. C.

(No Model.) 2 Sheets—Sheet 2.

L. GUTMANN.
ELECTRIC MOTOR.

No. 446,864. Patented Feb. 24, 1891.

Witnesses;
C. M. Benjamin
Nellie L. Pope

Inventor;
Ludwig Gutmann
By Edward P. Thompson
his Attorney.

UNITED STATES PATENT OFFICE.

LUDWIG GUTMANN, OF PITTSBURG, PENNSYLVANIA.

ELECTRIC MOTOR.

SPECIFICATION forming part of Letters Patent No. 446,864, dated February 24, 1891.

Application filed September 18, 1890. Serial No. 365,372. (No model.)

*To all whom it may concern:*

Be it known that I, LUDWIG GUTMANN, a subject of the Emperor of Germany, and a resident of Pittsburg, county of Allegheny, and State of Pennsylvania, have invented certain new and useful Improvements in Electric Motors, (Case 47,) of which the following is a specification.

My invention relates to improvements in electro-dynamic motors of the class operated by alternating, pulsating, or intermittent currents.

The invention consists in using alternating or intermittent electric currents in the field-magnet coils of the motor, whose several cores are suitably subdivided to prevent heating, energizing the same, creating a magnetic field which by induction acts on one or more close-circuited ring-windings of the open or closed type, and generating in a single winding of the armature secondary currents differing in quantity and lag from one another by the external application of one or more short-circuiting brushes. An increase in torque can be obtained by additional or second armature-coils, also wound on the same armature-core, and also inductively acted upon by the field. These second armature-coils may be connected to a commutator in a way like open or closed coil armature-windings; further, the ohmic resistance of these latter may be the same as those of the first winding; but preferably the ohmic resistance is lower, so as to possess less self-induction. The armature-windings may be wound one on top of the other; but it is preferred to wind separate coils side by side, so that coils belonging to different circuits are placed alternately side by side around the core. The commutator-segments may be arranged in one circle to form but one commutator, of which neighboring segments belong to different circuits.

Figure 1:
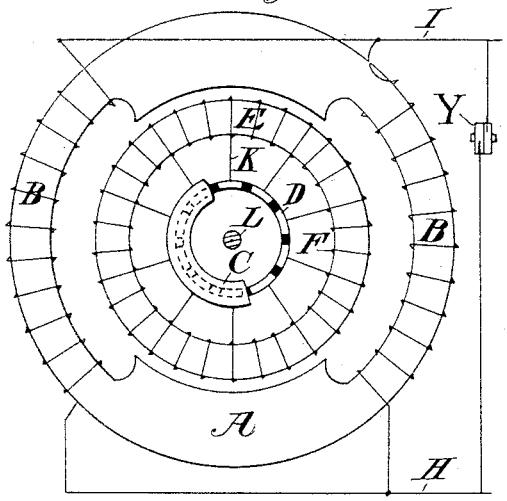
Figure 13:
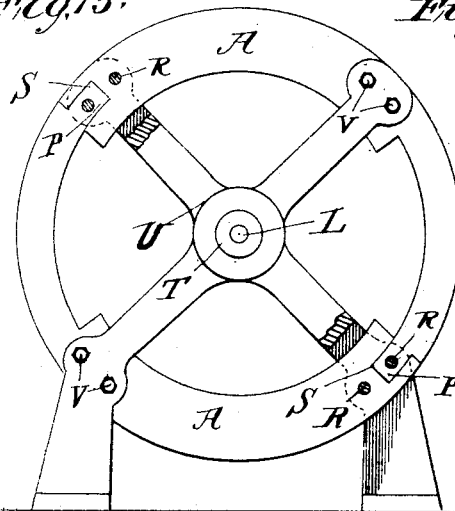
Figure 14:
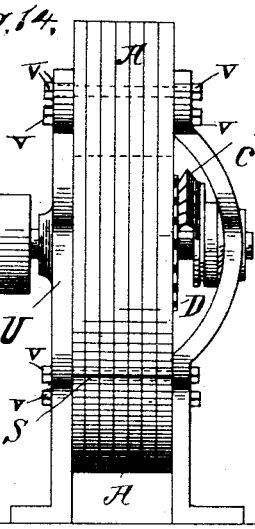
Figure 15:
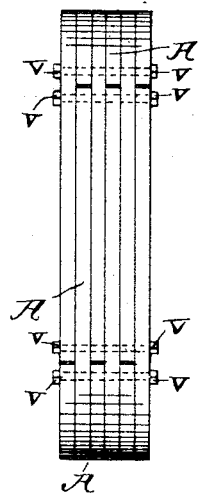

Figures 1, 2, 3, 4, 5, and 6 show in partial diagram modifications of the motor, which is in its simplest form in Fig. 1. Figs. 7, 8, 9, 10, 11, and 12 show modifications of the brush for the motor. Figs. 13, 14, and 15 show different rectangular and sectional views of the structure of the field-magnet core and frame, the magnet-winding being omitted.

In attached drawings the same letters in different figures represent similar parts.

In all A is a field-magnet core of thin annealed iron or steel plates or of other suitable material.

B and B' are field-exciting coils.

C is an adjustable short-circuiting brush.

D is a commutator.

E is the armature-core.

F and F' are armature-windings closed upon themselves.

F'' are closed groups of winding.

G is an armature-winding of the open-coil type.

H and I are the conducting-wires which electrically connect the generator Y with the motor.

K and N are wires connecting armature-coils with their respective commutator-segments.

L is the shaft on which the complete armature is mounted so as to be movable relatively to the field or their poles, the bearings being omitted in the first six figures, they being intended to represent diagrams.

The principle of this motor may be applied to any existing form or type of dynamo or motor.

M is a circuit-establishing wire connecting a number of armature-coils.

R are bolt-retaining holes in the laminated cores.

T is the bearing or support of shaft L.

U is an end plate or support adapted to solidly hold together the laminæ of the core by means of bolts V. (Shown in Figs. 13, 14, and 15.) The bearings T are shown here to be attached to or to be in one piece with the end plates U.

P is a projection on the core element extending into the pole-recess S.

In Fig. 1 is shown a two-pole motor whose field-magnet coils are connected in parallel with each other to the main line or generator-supply line H I. The armature, in no way connected to the generating-circuit, is provided with a single continuous winding F, closed on itself and divided by conductors K into a number of equal subdivisions, which are connected to the commutator-segments D. A single brush or block C is applied to said commutator, and is shown in detail in various modifications in Figs. 7, 8, 9, 10, 11, and 12. It is of special construction and designed to improve the state or conditions of the motor or the motor plant when in operation.

It will be noticed that the coils are each closed upon themselves on about one half of the armature, while the second half, forming one long winding, is also closed on itself by the same brush C. If now an alternating or intermittent current is sent through the winding B, the lines of force will circulate from one pole through the armature-core to the second pole; but owing to the peculiar construction of the brush the lines will neither divide into equal halves in the armature-core nor are their effects alike. The left side contains, by virtue of the brush, a winding of very low self-induction, producing, therefore, a current which lags but an extremely small time interval behind that of the energizing-current, while the second half, having a higher self-induction, needs more time to establish the secondary current. This fact has a number of consequences which are material to make efficient motors, namely: As the induced currents in the left half of the motor lag but an extremely short time behind the exciting-current, poles are established at a time when the magnetization by the energizing-current is almost still at its maximum. Therefore the currents and their effect in that part of the armature will be greater than if the lag were greater. Poles are first established in the core at the right of the ends of the brush C, which poles are gradually repelled and produce resultant poles at the ends of the brush as soon as the current in the right-hand half of the armature reaches its maximum, which necessarily is a little behind that of the short-circuited half. The poles developed then are of an oscillating or shifting character, and as one set is established earlier than the other the secondary or armature poles will remain established a longer time than if the self-induction in both halves were equal and the poles not oscillating or shifting, but fixed at the part of the brush-contact. A second effect of importance is the generator and motor efficiency.

A great drawback of induction-motors is that as soon as lines of force have passed the armature-winding the closed coils or circuits establish a field of their own, repelling the lines coming from the field-poles, which are thrown out without doing useful work for the time that the secondary field predominates. The secondary armature-poles, furthermore, effect the field-poles, reducing the self-induction and causing an increased flow of current in the field-magnet coils and a stronger flow of lines of force at a time when the secondary repelling-field is the strongest. This has the tendency to increase the self-induction of the line and the whole energizing-circuit, as we have not only to consider the periods of the primary current, but also those caused by the reaction of the secondary poles, which also cause fluctuation of alternately stronger and weaker currents in the field-magnet coils, as well as main lines H I. This effect necessarily increases the work of the generator and reduces the output of the motor. In the present motor this last-named effect is thought to be considerably reduced by not having equal self-induction in both halves of the armature, so that the field of force is reduced gradually, being expelled first in one part and then in the other, which state would necessarily cause the above-described shifting of the resultant poles.

Figure 2:
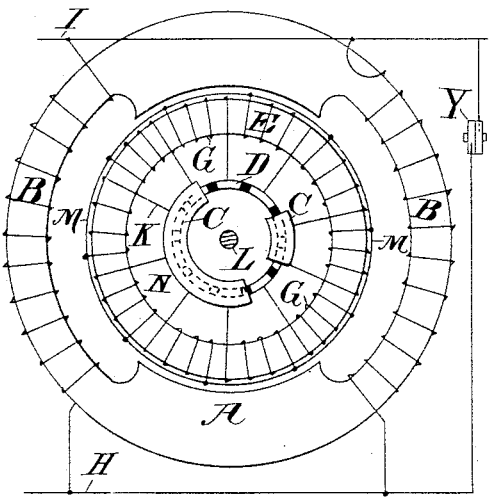

Fig. 2 is a modification of Fig. 1, the difference being that an open-coil armature is shown instead of a closed type. The several sub-coils have all of one set of ends connected together, as shown here, by the wire M, which is common to all, while the remaining ends N are connected in succession to the commutator D. The commutator is supplied with two brushes of unequal size. The operation will be the same as in Fig. 1; but the magnetic effects will be similar, but not identical.

Figure 3:
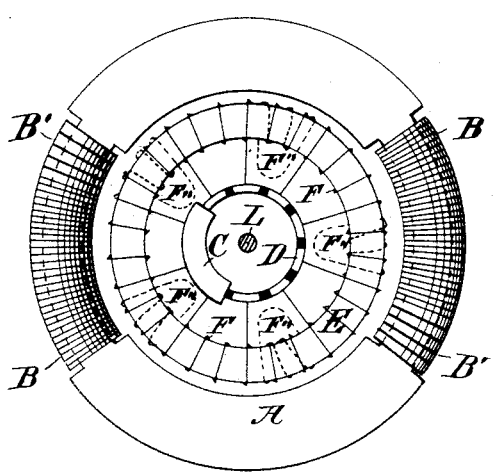

Fig. 3 shows another modification of Fig. 1. The field-magnet has in this case four coils instead of two. The coils B' are secondary coils mounted on the field-magnet core and normally closed. On the armature are shown by dotted lines F'' a number of separate and permanently-closed circuits. Such windings may be placed with good result on the armature. The poles developed will be of the same nature as those produced by the short-circuiting brush, and will act by helping to increase the torque and reduce the self-induction of the motor. In the figures, for sake of clearness and simplicity, ring-armatures have been shown; but it is self-evident that other armatures may be used with the same effect.

Figure 4:
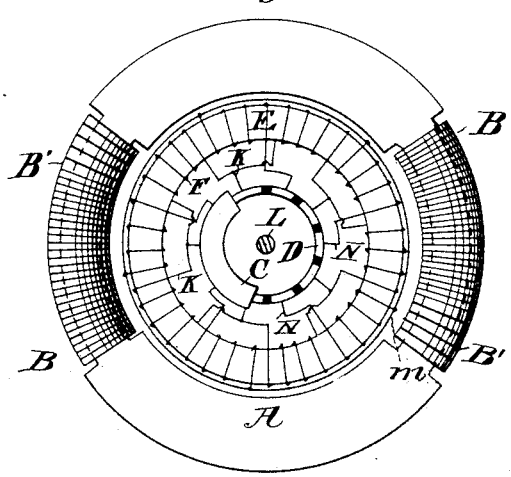

Fig. 4 shows another modification of the armature-winding, it being composed of the two shown in Figs. 1 and 2—viz., of a closed and an open armature-winding. The ends K of the closed coil-winding F are connected to commutator-blocks, as also are the ends N of the open coil-windings G, while the second ends of the latter coils are connected, as in Fig. 2, to the common wire M. For simplicity of construction the commutator-segments of both separate windings are placed so as to form one commutator D, needing but one brush C. As sub-coils of the two windings are shown placed alternately, the commutator-segments are shown arranged in similar manner. This armature is electrically unbalanced, from which we find, first, a number of coils of the closed windings each closed upon itself, while the remainder form but one closed winding; further, a number of the open coils are also closed upon themselves, while the rest are open and do not participate in the operation of the motor. The action and effects are similar to those of Fig. 1, but more pronounced. The two windings are shown of the same strength or size of wire; but the sizes may be varied as the particular work of the motor may demand.

Figure 5:
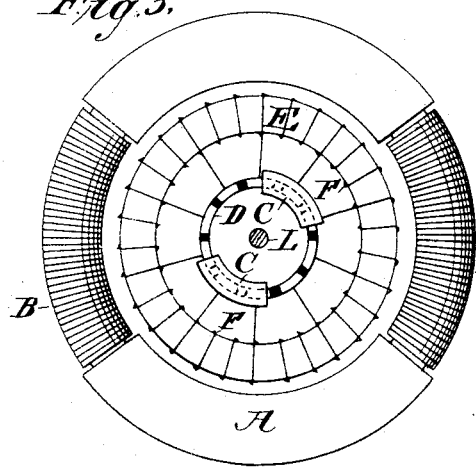

Fig. 5 is the same as Fig. 1, with the one difference that two short-circuiting blocks are applied. The effect is multiplied by the second brush, and the one closed armature-winding constitutes in this case four separate windings, in which a circuit of high inductive capacity is placed alternately with one of low inductive capacity.

Figure 6:
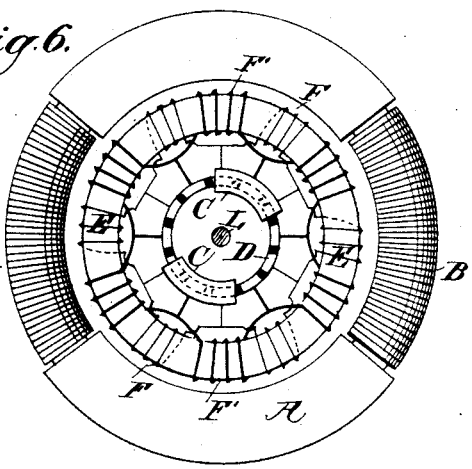

Fig. 6 is another modification, in which two armature-windings, like Fig. 5, are placed on the same core. The windings may have the same ohmic resistance, or else, as shown, one may consist of a heavier winding than the other. The various armatures described may be placed within field-magnets having but one exciting-circuit, as shown in Figs. 1 and 2, or may be operated within a compound magnet, as shown in Figs. 3 and 4, a magnet having different windings, the current-phases of which may lag slightly behind one another.

Figures 7, 8, 9, 10, 11:
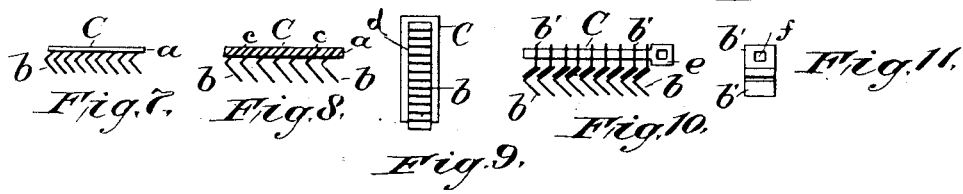
Figure 12:
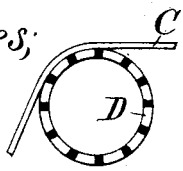

Figs. 7, 8, 9, 10, 11, and 12 show brush constructions adapted to operate the motor. Fig. 7 shows metal strips or plates bent into angle-pieces $b$, the upper ends of which are soldered together and preferably attached to a plate or support $a$. Fig. 8 is similar to Fig. 7, except that distance-pieces $c$ are interposed between the angle-pieces $b$, so as to give the brush flexibility when resting on the commutator. Fig. 9 shows a frame $d$, in which the brush is supported. Fig. 10 shows a modification. The distance-pieces $c$ are replaced by pieces like $b$, but placed in inverted position. These plates, as shown in Fig. 11, are provided with one or more perforations $f$ for the insertion of a suitable support $e$, which, being attached to the motor-frame, is adapted to hold the brush in position. Fig. 12 shows two equivalent forms of brushes. Depending on the position of the closed coil in the magnetic field and the resultant armature-poles the movable part of the motor may rotate either in one direction or the other; further, the speed also depends on the reaction and can be regulated by the position of the brushes. In all motors where a variable speed is desirable the brushes may be supported in such a manner as to allow shifting. In other motors—as, for instance, for driving fans, ventilators, &c.—the brushes are preferably fixed after the best position and that of least sparking has been ascertained.

To make the core of commercial value, especially when used for small motors, it becomes imperative to be able to make the field-winding on a lathe instead of threading the wire through the central hole. To be able to accomplish the above, the core is divided into two parts, so that one pole-extension and one core for a magnetic coil form a single piece, of which two equal parts have to be placed together to form the double-pole magnet, as shown in Fig. 13. To increase the solidity of the structure, each half is provided with a projection P and a recess S, so as to lodge the projection P of one half in the recess S of the other half. The same is done whether the core is solid or laminated. In this latter case each core element consists of two pieces lying in the same plane. The element piece consists of one pole-piece and a core part, which, when complete, is surrounded by the energizing-coil. The shape of it may be modified, and may be either circular or straight. As shown in Fig. 13, the core portions or elements are provided with holes R for retaining the bolts V V, which hold the parts solidly together with the end plates U U, which latter may be used as bearings and stand for the motor. (See Fig. 14.) The laminæ may be superposed, so as to form two solid parts similar to solid metal structures, as shown in Fig. 14, where the armature E, commutator D, and brush C are mounted within the field-magnet structure, which latter covers the whole of the armature and part of the commutator. In this case the projections P of all the laminæ form together one wide projection, and the recesses S of the laminæ form a single curvature or groove in the pole part. This is indicated by the heavy straight line marked S, or else the element-plates may be placed to break joints, as shown in Fig. 15. After the coils have been completed they are placed over the field-magnet part they are intended to surround, then the core portions, with the coils mounted, are interlocked by the projections and recesses, and the whole united in a solid structure by the bolts V and end plates U. In these figures two pole-magnet structures have been shown; but the core construction of interlocking parts lying in the same plane can evidently be applied to a magnet having four or more poles without changing the nature of this invention, as each pole projection and one magnet-core form a single piece or element, and the magnet-core of one element is interlocked with the pole projection of one of the neighboring elements, and its pole projection is united with the magnet-core of other neighboring elements.

I claim as my invention—

1. The combination, with the field-magnets of an electric motor, of an armature having its armature-coils permanently closed upon themselves, a commutator having its plates connected with different points in the length of the armature-coils, and a brush applied to and in electrical contact with contiguous commutator-plates.

2. The combination, with the field-magnets of an electric motor, of an armature having its armature-coils permanently closed upon themselves, a commutator having its plates connected with different points in the length of the armature-coils, and a brush short-circuiting less than half of the armature-coils, the coils thus short-circuited being contiguous to one another.

3. The combination, with the field-magnets of an electric motor, of an armature having two independent sets of armature-coils placed alternately to one another and each permanently included in a closed circuit, a commutator having its plates connected with different points in the length of the armature-coils, and a brush short-circuiting less than half of the armature-coils.

4. An alternating-current motor consisting of one or more field-magnets in circuit with a generator, a rotating armature whose winding is closed upon itself, and means, such as a brush, for close-circuiting successive armature-coils each upon itself.

5. An alternating-current motor consisting of field electro-magnets included in one circuit, a rotating armature provided with one or more subdivided windings closed upon themselves, a commutator having its plates connected with different points in the length of said winding or windings, and brushes each normally close-circuiting successive subdivided windings each upon itself.

6. An alternating-current motor comprising a rotating armature provided with one or more subdivided windings, a commutator having its plates connected with different points in the length of said winding or windings, one or more brushes normally closing successive subdivided windings each upon itself, and field electro-magnets included in circuits independent of that of the armature and having several separate windings.

7. In an element for construction of electro-magnets, the combination, with a pole-piece provided with a recess S, of a one-sided extension adapted to receive the magnet-winding, and a lug or projection P, forming the extremity of said extension.

8. In a core for electro-magnets, the combination of two or more core structures mechanically and electrically united, each structure consisting of a pole-piece provided with a recess on one side and an extension on the other, and a lug forming the extremity of said extension, adapted to be retained in the recess of the neighboring structure.

9. In an electric motor, the combination of an armature having two or more separately-closed armature-windings, a commutator having its contact-plates connected with two or more of said windings, one or more brushes in contact with said commutator, and field electro-magnets having an energizing-circuit and normally-closed secondary circuits.

10. An alternating-current motor comprising primary and secondary field electro-magnets, an armature whose winding is subdivided and having one or more closed circuits, a commutator whose plates are connected to said subdivisions, and one or more brushes normally and constantly connecting successive commutator-plates.

11. An alternating-current induction-motor comprising a two or more pole field electro-magnet, energizing-windings for said electro-magnet supplied from a single source of generation, an armature having two or more subdivided windings, contact-terminals connected to said subdivided windings, and a brush in contact with terminals of said windings for including all the sub-coils of one winding in two or more closed circuits.

12. An alternating-current electric motor comprising a two or more pole field electro-magnet whose winding is energized by a single source of electricity, an armature having two or more subdivided windings angularly displaced the one from the other, contact-terminals connected to said subdivided windings, and one or more brushes in contact with terminals of both windings for simultaneously close-circuiting sub-coils of said two or more windings.

In testimony that I claim the foregoing as my invention I have signed my name, in presence of two witnesses, this 10th day of September, 1890.

LUDWIG GUTMANN.

Witnesses:
H. M. DUNLAP,
SAMUEL WALLACE.